J. W. KENNEDY.
Hose-Couplings.

No. 140,374.

Patented July 1, 1873.

Witnesses
Thos. C. Adams
William Steinhoff

Inventor
J. W. Kennedy

UNITED STATES PATENT OFFICE.

JOSIAH W. KENNEDY, OF ST. LOUIS, MISSOURI.

IMPROVEMENT IN HOSE-COUPLINGS.

Specification forming part of Letters Patent No. 140,374, dated July 1, 1873; application filed April 3, 1873.

*To all whom it may concern:*

Be it known that I, JOSIAH W. KENNEDY, of the city and county of St. Louis and State of Missouri, have invented certain Improvements in Hose-Couplings, of which the following is a specification:

My invention consists in placing inside the hose, at its end, a tube-section, having a raised rim on its outer surface, which is preferably $\wedge$-shaped. The hose rests on this raised rim, and is firmly clamped against it by a sleeve arranged on the outside of the hose, said sleeve being operated by being internally screw-threaded, and screwing on to a screw-threaded collar, abutting against the internal tube-section. Suitable metal friction-rings are placed between the sleeve and the hose, and the hose and the screw-threaded collar, so as to prevent the parts from binding on the hose in the turning of the parts, and thereby prevent the rupture of the hose.

Figure 1:
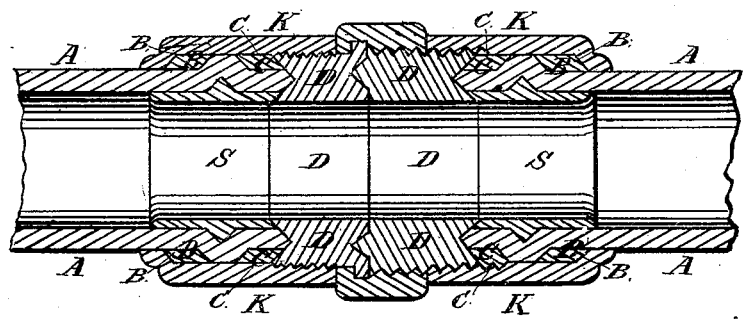
Figure 2:
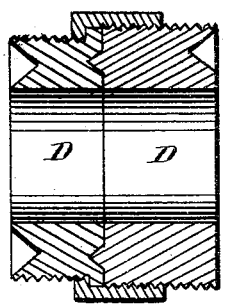
Figure 3:
Figure 4:
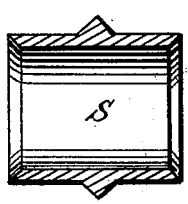
Figure 5:
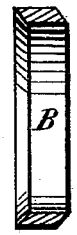

Figure 1 is an axial section of my improved coupling. Figs. 2, 3, 4, 5 are detail sections of parts.

S is a tube-section, having a raised $\wedge$-shaped rim or collar, projecting from its outer surface, over which the hose A is drawn, as indicated in Fig. 1. K is a sleeve arranged on the outside of the hose-pipe A, which is impelled forward to clamp the hose firmly against the raised rim or collar of the internal tube-section S, by being internally screw-threaded, and screwing on to a screw-threaded nut or rim D. B C are friction-rings, which are placed between the parts that bear on the hose, so as to prevent tearing the same in turning, and also for clamping the same firmly. In applying the improved coupling to a hose the sleeve K is slipped over the hose, and the ring B after it. The tube-section S is then placed inside the hose, the other ring C is introduced, and the sleeve G screwed on to the screw-threaded rim D, so as to firmly clamp the hose A against both sides of the $\wedge$-shaped projection of the tube-section S and form the coupling.

Having thus fully described my invention, what I claim as new, is—

1. The internal tube-section S, having a raised rim on its outer surface in combination with the sleeve K and screw-threaded nut or rim D, as and for the purpose set forth.

2. The combination and arrangement of the internal tube-section S, having a raised rim on its outer surface, with the sleeve K, screw-threaded rim D, and friction-rings B and C, as and for the purpose set forth.

JOSIAH W. KENNEDY.

Witnesses:
 WILLIAM STEINHOFF,
 THOS. C. ADAMS.